US012798308B2

(12) United States Patent
Yamakita et al.

(10) Patent No.: US 12,798,308 B2
(45) Date of Patent: Nov. 17, 2026

(54) VEHICLE BODY REAR STRUCTURE

(71) Applicant: Honda Motor Co., Ltd., Tokyo (JP)

(72) Inventors: Kyosuke Yamakita, Tokyo (JP); Keisakuro Yamaguchi, Tokyo (JP); Yusuke Miura, Tokyo (JP); Masayuki Yoshida, Tochigi-pre (JP); Hiroki Kashimoto, Tokyo (JP); Haruki Aizawa, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 439 days.

(21) Appl. No.: 18/491,816

(22) Filed: Oct. 23, 2023

(65) Prior Publication Data

US 2024/0140150 A1 May 2, 2024

(30) Foreign Application Priority Data

Oct. 27, 2022 (CN) ......................... 202211325234.4

(51) Int. Cl.
*B60D 1/24* (2006.01)
*B60D 1/48* (2006.01)
*B62D 25/20* (2006.01)

(52) U.S. Cl.
CPC ............. *B60D 1/243* (2013.01); *B60D 1/485* (2013.01); *B62D 25/209* (2013.01)

(58) Field of Classification Search
CPC .......... B60D 1/243; B60D 1/485; B60D 1/04; B60D 1/48; B60D 1/488; B62D 25/209; B62D 25/087; B62D 21/152
USPC .......................................................... 280/495
See application file for complete search history.

(56) References Cited

U.S. PATENT DOCUMENTS

2011/0156431 A1* 6/2011 Souma ................. B62D 21/152 296/37.2
2018/0050734 A1* 2/2018 Olsson ................... B62D 43/10
2019/0375459 A1* 12/2019 Yoshimoto ............ B62D 21/11

FOREIGN PATENT DOCUMENTS

JP 2012081877 4/2012
JP 2015093617 5/2015
JP 2016185739 10/2016
JP 2022014526 1/2022
JP 2022014526 A * 1/2022 ............... B60D 1/06

(Continued)

OTHER PUBLICATIONS

Merged original document with English Translation (JP H0717430). (Year: 2026).*

(Continued)

*Primary Examiner* — Timothy Wilhelm
*Assistant Examiner* — Nathaniel William Watkins
(74) *Attorney, Agent, or Firm* — JCIPRNET

(57) ABSTRACT

The disclosure provides a vehicle body rear structure, which can reduce damage to the vehicle during a collision from the rear. The vehicle body rear structure includes a chassis rear, a hook reinforcement part fixed to a lower surface of the chassis rear; and a hook fixed on a back side of the chassis rear through the hook reinforcement part, in which the hook reinforcement part includes a plurality of part members independent from each other, the plurality of part members are connected in series and joined in a front-back direction of the vehicle to form a joint boundary part, and the joint boundary part is disposed with a weakened part on a side close to the chassis rear.

12 Claims, 7 Drawing Sheets

(56) References Cited

FOREIGN PATENT DOCUMENTS

| | | |
|---|---|---|
| JP | 2023128523 | 9/2023 |

OTHER PUBLICATIONS

"Office Action of China Counterpart Application", issued on Jul. 13, 2026, with English translation thereof, p. 1-p. 13.

* cited by examiner

VEHICLE BODY REAR STRUCTURE

CROSS-REFERENCE TO RELATED APPLICATION

This application claims the priority benefit of China application serial no. 202211325234.4, filed on Oct. 27, 2022. The entirety of the above-mentioned patent application is hereby incorporated by reference herein and made a part of this specification.

BACKGROUND

Technical Field

The disclosure relates to a vehicle body rear structure.

Description of Related Art

In recent years, efforts to provide access to sustainable transport systems that also take into account vulnerable persons such as the elderly or children among traffic participants are being activated. In order to achieve the above purpose, research and development for further improving traffic safety or convenience are being pursued through development related to collision safety performance.

In the past, a trailer hitch device for towing was installed on the back end part of the vehicle. However, when the vehicle receives a collision from the rear, the amount of movement of the trailer hitch device to the front tends to increase, which may cause excessive damage to the vehicle. Therefore, in the collision safety performance, how to install a corresponding safety structure when receiving a collision from the rear is an essential issue. For example, in the trailer hitch device for towing and the towing device of Patent Literature 1 (Japanese Patent Laid-Open No. 2022-014526), a reinforcing member for a jack rod on which a jack abuts is disposed on the chassis of the vehicle. In addition, a weak part extending in the width direction of the vehicle is disposed on a bottom surface of the reinforcing member. In this way, when receiving a collision from the rear, the reinforcing member can be bent at the weak part due to the compressive load acting in the front-back direction, and through a manner that the front end part thereof is restrained by the beam, the reinforcing member can form a mountain-fold shape. In this way, the reinforcing member thereof does not invade the housing accommodating electrical components of the vehicle body even when being bent, so that the damage to the vehicle during the collision from the rear can be reduced.

However, in Patent Literature 1, the reinforcing member comprises a single element, and has a bracket at a back end part thereof for forming a lifting point when the vehicle is jacked up by a jack. However, in vehicle models with a high position at the chassis rear, the position for installing the bracket is high. Therefore, it is necessary to dispose a structure that makes the bracket relatively lower than the chassis rear. In this situation, how to dispose the weak part is an issue yet to be resolved.

SUMMARY

The disclosure provides a vehicle body rear structure, which can reduce damage to the vehicle during a collision from the rear.

The disclosure provides a vehicle body rear structure. The vehicle body rear structure includes a chassis rear, a hook reinforcement part fixed to a lower surface of the chassis rear, and a hook fixed on a back side of the chassis rear through the hook reinforcement part, in which the hook reinforcement part includes a plurality of part members independent from each other, the plurality of part members are connected in series and joined in a front-back direction of the vehicle to form a joint boundary part, and the joint boundary part is disposed with a weakened part on a side close to the chassis rear.

Based on the above, the hook reinforcement part of the vehicle body rear structure can make the hook reinforcement part bend at a target position through the disposition of the weakened part and the bent part of the joint boundary part, and a deformation mode of the vehicle body rear structure when receiving a collision load from the rear of the vehicle is easily controlled, so that the hook reinforcement part cannot invade the housing at the front accommodating the electrical components of the vehicle body when deformation occurs, and the damage to the vehicle during the collision from the rear can be reduced. Moreover, the hook of the vehicle body rear structure can also increase the upper limit of the towing force when being towed by the towing device through the disposition of the side connection part and the lower connection part of the joint boundary part. Furthermore, since the welding bead outline is formed near the side connection part of the hook reinforcement part at the joint boundary part, positioning can be performed easily during spot welding, and workability can be improved.

In order to make the above-mentioned features and advantages of the disclosure more comprehensible, the following embodiments are described in detail with reference to the accompanying drawings.

DESCRIPTION OF THE EMBODIMENTS

In an embodiment of the disclosure, the joint boundary part is disposed with a bent part on a side away from the chassis rear.

In an embodiment of the disclosure, the plurality of part members of the hook reinforcement part includes: a first hook reinforcement part, in which a size of the first hook reinforcement part in the front-back direction of the vehicle is larger than a size in an up-down direction of the vehicle; and a second hook reinforcement part, in which a size of the second hook reinforcement part in the front-back direction of the vehicle is smaller than a size in the up-down direction of the vehicle, and the first hook reinforcement part and the second hook reinforcement part are formed as a side connection part of the joint boundary part in such a manner that a side part of the first hook reinforcement part and a side part of the second hook reinforcement part are connected to each other in a width direction of the vehicle.

In an embodiment of the disclosure, the side connection part is formed in such a manner that one of the first hook reinforcement part and the second hook reinforcement part is covered by the other one of the first hook reinforcement part and the second hook reinforcement part from outside of the width direction of the vehicle, and a welding bead outline extending in such a manner including a position corresponding to a spot welding part is formed on the side part of the one of the first hook reinforcement part and the second hook reinforcement part.

In an embodiment of the disclosure, the first hook reinforcement part has a lower flange part, and the lower flange part extends in a direction away from the chassis rear and is connected with a front surface of the second hook reinforcement part to form a lower connection part of the joint boundary part.

In an embodiment of the disclosure, the bent part is positioned on a side of the lower flange part close to the first hook reinforcement part.

Figure 1A:
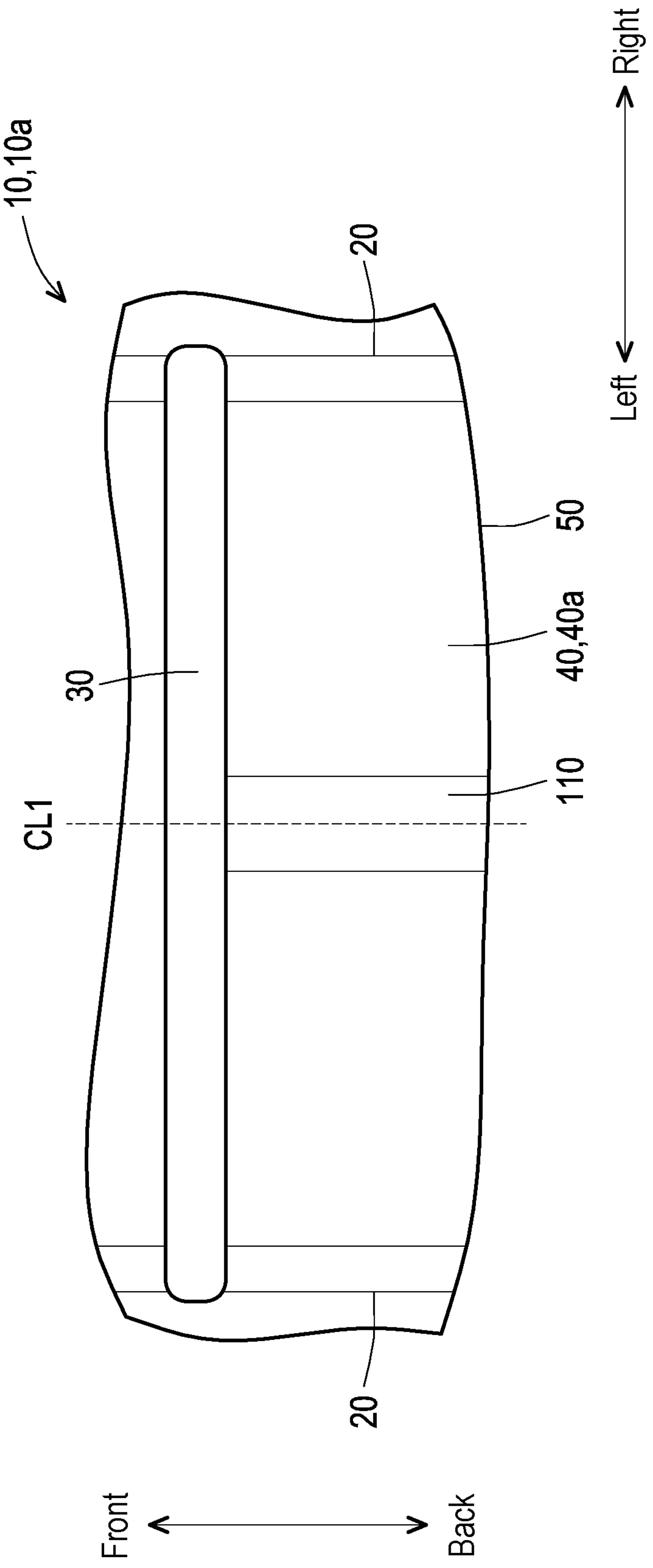
FIG. 1A is a top view of a vehicle body rear structure according to an embodiment of the disclosure.
Figure 1B:
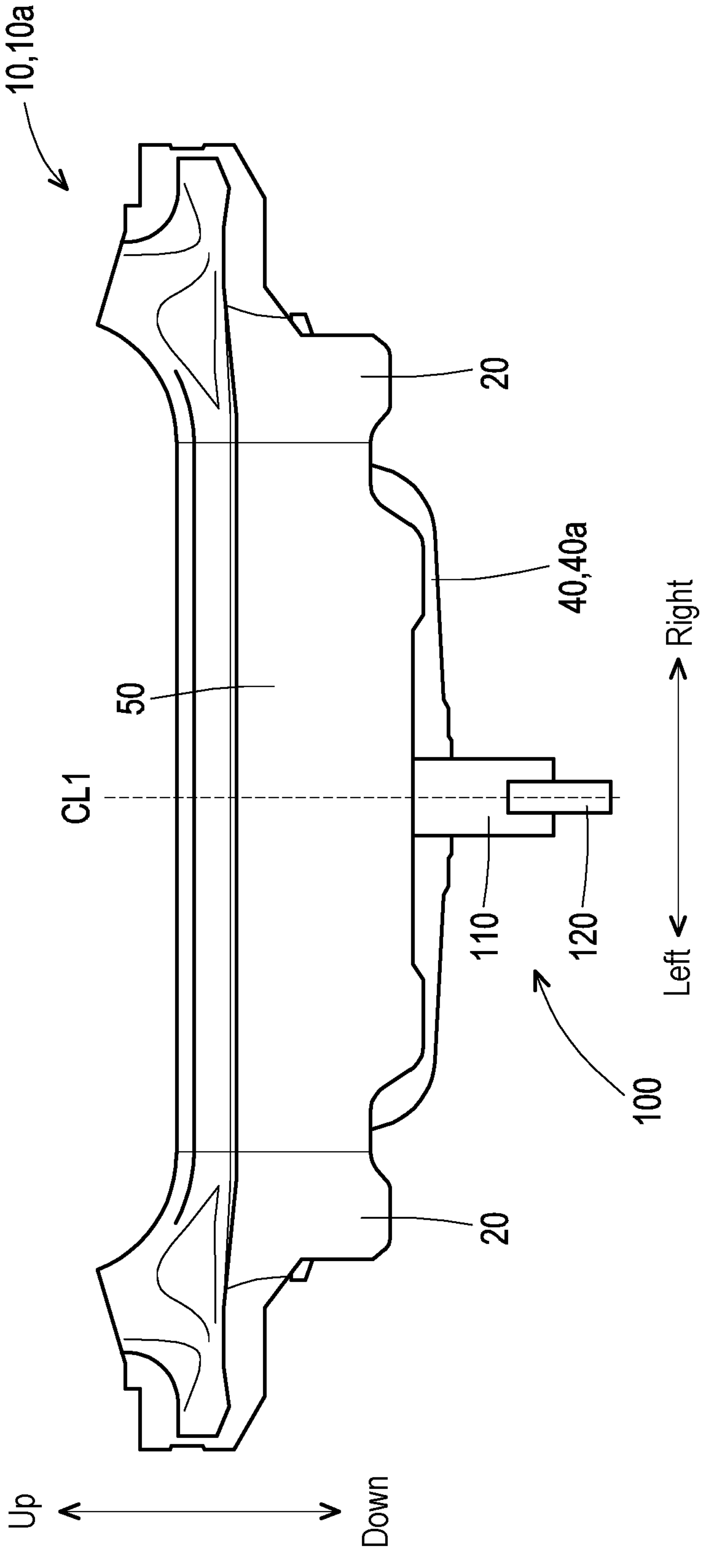
FIG. 1B is a rear view of the vehicle body rear structure shown in FIG. 1A.
Figure 2:
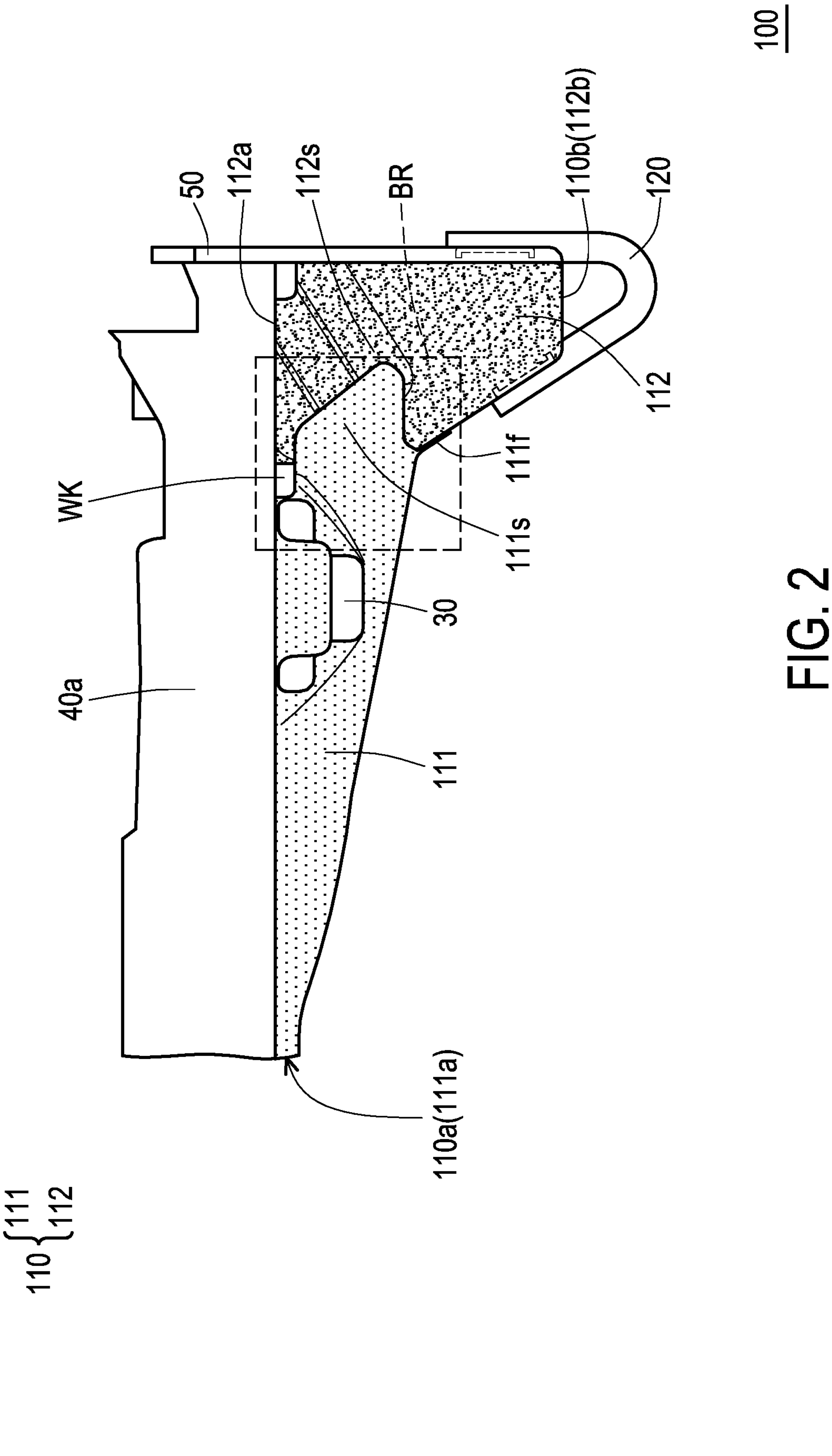
FIG. 2 is a side view of the vehicle body rear structure shown in FIG. 1A.
Figure 3:
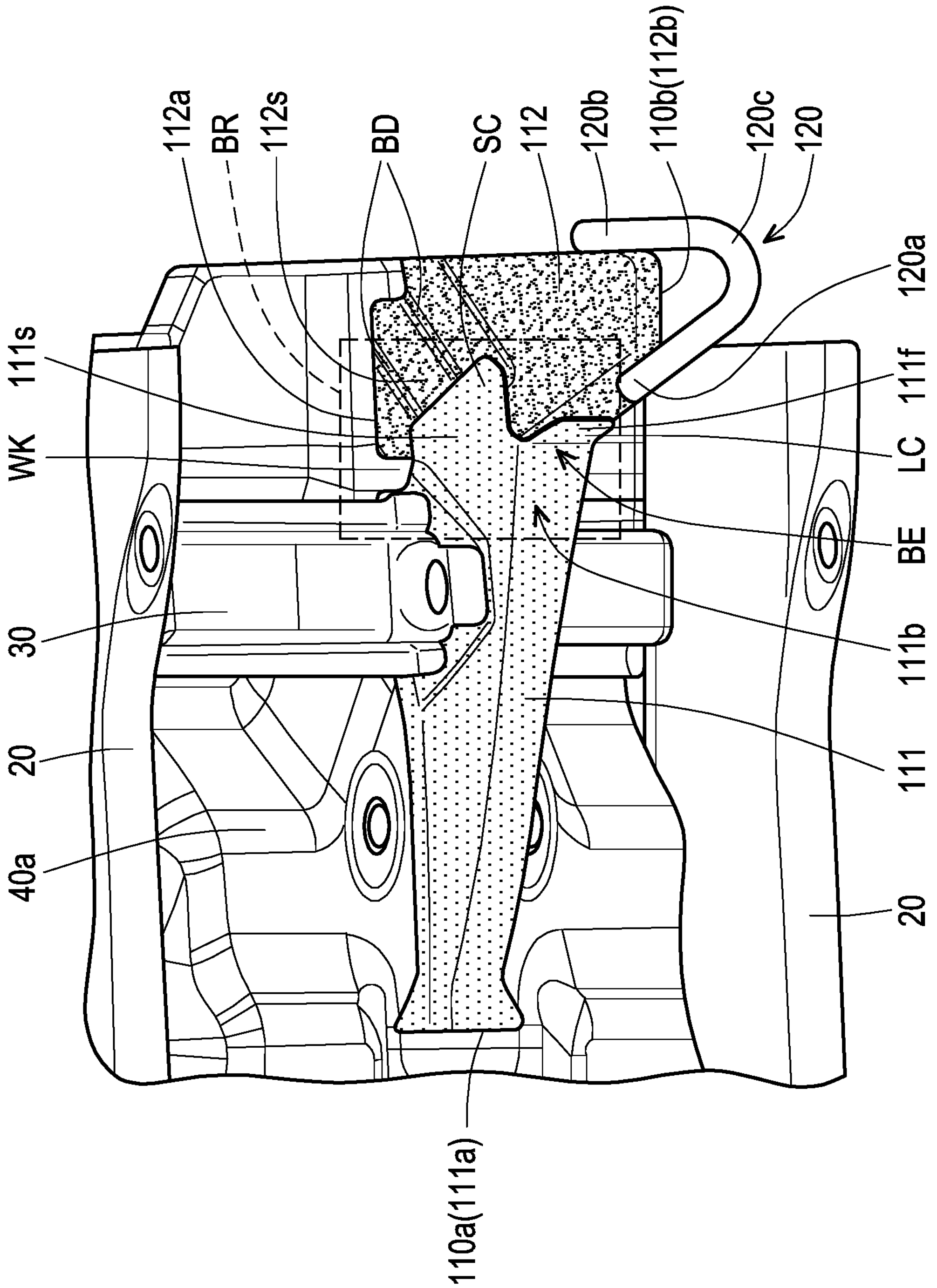
FIG. 3 is a bottom view of the vehicle body rear structure shown in FIG. 1A.
Figure 4:
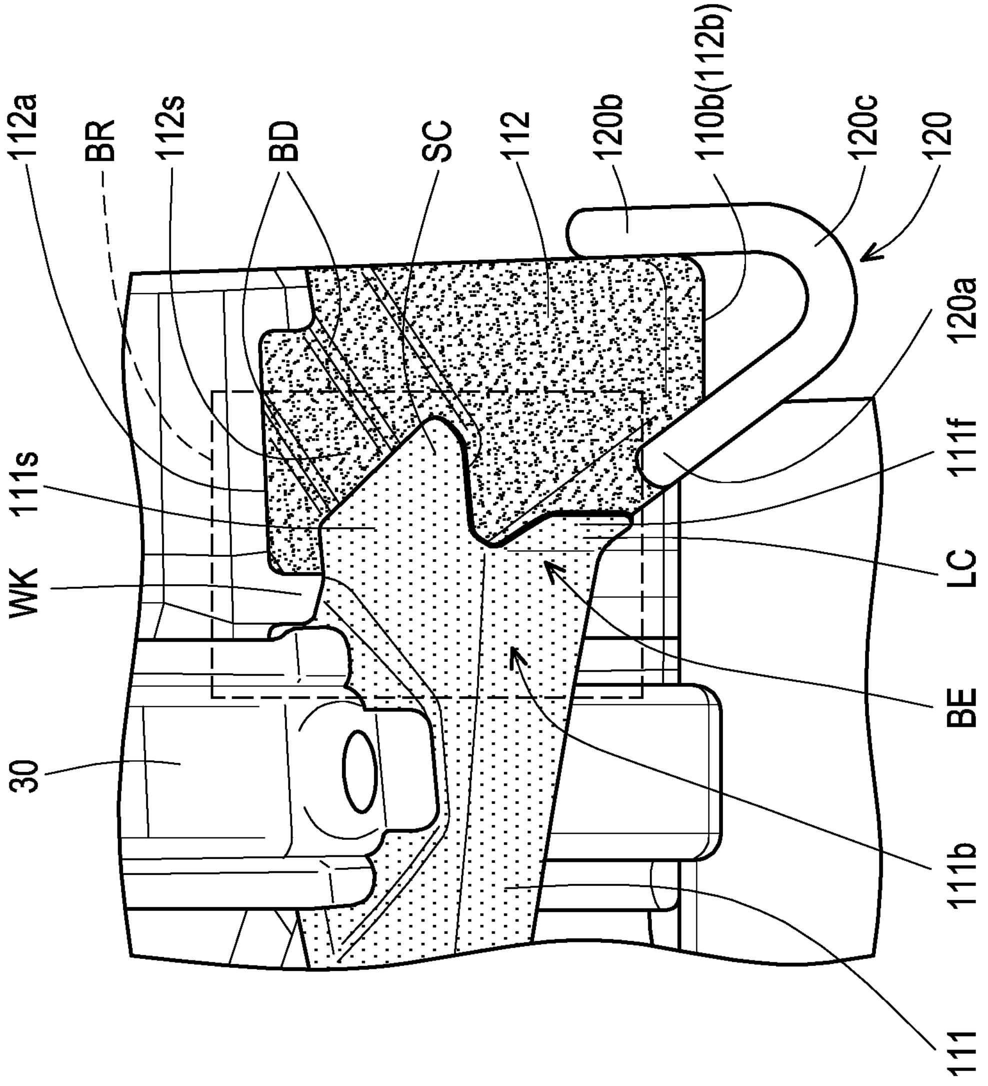
FIG. 4 is an enlarged schematic view of a joint boundary part shown in FIG. 3.

FIG. 1A is a top view of a vehicle body rear structure according to an embodiment of the disclosure; FIG. 1B is a rear view of the vehicle body rear structure shown in FIG. 1A; FIG. 2 is a side view of the vehicle body rear structure shown in FIG. 1A; FIG. 3 is a bottom view of the vehicle body rear structure shown in FIG. 1A; FIG. 4 is an enlarged schematic view of a joint boundary part shown in FIG. 3. It should be noted that, for the convenience of description, the front-back direction, the left-right direction, and the up-down direction of a vehicle are defined as shown in the drawings, and the structure of each part is described according to this definition. The front-back direction, the left-right direction, and the up-down direction correspond to the length direction, the width direction, and the height direction of the vehicle, respectively.

Please refer to FIG. 1A and FIG. 1B. In the embodiment, a vehicle 10 is a vehicle (such as an electric vehicle) having a driving motor as a driving source for driving, and has a battery storing power supplied to the driving motor and a control unit for controlling supplying power from the battery to the driving motor. It should be noted that the vehicle 10 may also be a hybrid vehicle having the driving motor and an engine as the driving source for driving or a vehicle having only the engine as the driving source for driving.

As shown in FIG. 1A and FIG. 1B, in the embodiment, the vehicle 10 has a vehicle body frame 10*a* constituting a vehicle body. Furthermore, as shown in FIG. 1A, separated by a bottom part of the vehicle body frame 10*a*, through a center line CL1 extending in the front-back direction of the center of the vehicle 10 in the left-right direction, a pair of left and right back side frames 20 are disposed extending in the front-back direction. The back side frame 20 has a hollow and approximately rectangular cross-section, a back end surface thereof is positioned at a back end part of the vehicle body frame 10*a*. A beam 30 extending in the left-right direction are joined to bottom surfaces of the left and right back side frames 20, respectively. The back side frame 20 and the beam 30 are each made of a material with a high rigidity, and constitute the skeleton of the vehicle body frame 10*a*. Furthermore, as shown in FIG. 1B, a chassis 40 is disposed between the left and right back side frames 20 so as to protrude downward from the back side frames 20. An approximately plate-shaped rear panel 50 is disposed behind the chassis 40. The rear panel 50 extends in the up, down, left, and right directions so as to cover the back end surfaces of the left and right back side frames 20.

Further, in this embodiment, a vehicle body rear structure 100 refers to a partial structure positioned near the trailer hitch device for towing at the rear of the vehicle 10. As shown in FIG. 2, in the embodiment, the vehicle body rear structure 100 includes a chassis rear 40*a* of the chassis that is the rear of the chassis 40, a hook reinforcement part 110, and a hook 120. The hook reinforcement part 110 is disposed along the center line CL1 and fixed to a lower surface of the chassis rear 40*a*. For example, as shown in FIG. 1A and FIG. 2, the upper part of the hook reinforcement part 110 and the lower surface of the chassis 40 and the beam 30 are joined by welding or the like to be fixed.

Specifically, in this embodiment, the vehicle 10 is a model with the high chassis rear 40*a*, so it is necessary to make the hook 120 at a lower hook position relative to the chassis rear 40*a*, so as to be suitable for installing the trailer hitch device for towing. Therefore, in the embodiment, the vehicle body rear structure 100 forms the hook reinforcement part 110 in such a manner that a lower end part 110*b* of the back side of the hook reinforcement part 110 is positioned relatively lower than a front end part 110*a* of the hook reinforcement part 110, and the hook 120 is connected to the lower end part 110*b* of the hook reinforcement part 110 so that the hook 120 is positioned on a side of the hook reinforcement part 110 relatively far away from the chassis rear 40*a* in the up-down direction of the vehicle, so that the hook 120 may be in a low hook position. That is, as shown in FIG. 2, the hook reinforcement part 110 is positioned between the hook 120 and the chassis rear 40*a* in the up-down direction of the vehicle, and the maximum vertical distance from the lower surface of the lower end part 110*b* of the hook reinforcement part 110 to the chassis rear 40*a* is greater than the maximum vertical distance from the lower surface of the front end part 110*a* of the hook reinforcement part 110 to the chassis rear 40*a*. In this way, the hook 120 connected to the lower end part 110*b* of the hook reinforcement part 110 may be at a low hook position. More specifically, in this embodiment, the hook 120 may be presented in a bent shape in which a rod-shaped member is bent downward into a protruding shape. A front end part 120*a* and a back end part 120*b* of the hook 120 are combined with a front surface and a back surface of the lower end part 110*b* of the hook reinforcement part 110, respectively, and may be fixed on the back side of the chassis rear 40*a* through the hook reinforcement part 110. In addition, in this embodiment, a bottom part 120*c* of the hook 120 may comprise a lifting point when the vehicle 10 is jacked up by a jack.

Hereinafter, the detailed structure of the hook reinforcement part 110 will be further explained with reference to FIG. 3 and FIG. 4. In the embodiment, the hook reinforcement part 110 includes a plurality of part members independent from each other. Specifically, as shown in FIG. 3 and FIG. 4, in this embodiment, the plurality of part members include a first hook reinforcement part 111 and a second hook reinforcement part 112, in which the size of the first hook reinforcement part 111 in the front-back direction of the vehicle is larger than the size in the up-down direction of the vehicle, the size of the second hook reinforcement part 112 in the front-back direction of the vehicle is smaller than the size in the up-down direction of the vehicle, and the first hook reinforcement part 111 and the second hook reinforcement part 112 are connected in series and joined in the front-back direction of the vehicle to form a joint boundary part BR. That is to say, as shown in FIG. 3, in this embodiment, the length direction of the first hook reinforcement part 111 is the front-back direction of the vehicle, the length direction of the second hook reinforcement part 112 is the up-down direction of the vehicle, and a front end part 111*a* of the first hook reinforcement part 111 in the length direction may be form as the front end part 110*a* of the hook reinforcement part 110, and a lower end part 112*b* of the second hook reinforcement part 112 in the length direction may form as the lower end part 110*b* of the hook reinforcement part 110, and a back end part 111*b* of the first hook reinforcement part 111 in the length direction is joined to the second hook reinforcement part 112 in the length direction near an upper end part 112*a* to form the joint boundary part BR.

In this way, compared to directly adopting another hook reinforcement part structure comprising a single part but having to present a right triangle outline so that the hook 120 may be placed at a low hook position, the hook reinforcement part 110 comprising the plurality of part members may form respective portions of the hook reinforcement part 110 in different directions through the plurality of part members independent from each other, and the hook reinforcement part 110 may also adopt the second hook reinforcement part 112 having a long pyramid outline to reduce the volume of a part extending downward of the hook reinforcement part 110 as much as possible, to avoid the compression of the space under the chassis rear 40*a*.

Further, as shown in FIG. 4, the joint boundary part BR is disposed with a weakened part WK on a side close to the chassis rear 40*a*, in which the weakened part WK is, for example, a notch part formed when the first hook reinforcement part 111 and the second hook reinforcement part 112 are joined. In this way, although the hook reinforcement part 110 is constituted by using the plurality of part members, the hook reinforcement part 110 has high rigidity due to the stacked thickness of the part members near the joint boundary part BR, and the hook reinforcement part 110 becomes less prone to break in the event of a rear-end collision accident. However, at this time, the vehicle body rear structure 100 may still bend the hook reinforcement part 110 at the target position through the disposition of the weakened part WK (that is, the notch part), so that the deformation mode of the vehicle body rear structure 100 when receiving a collision load from the rear of the vehicle 10 may be easily controlled.

On the other hand, the joint boundary part BR may also be disposed with a bent part BE on a side away from the chassis rear 40*a*. Further, as shown in FIG. 4, in this embodiment, the back end part 111*b* of the first hook reinforcement part 111 has a lower flange part 111*f*, and the lower flange part 111*f* extends in a direction away from the chassis rear 40*a* and is connected with the front surface of the second hook reinforcement part 112 to form a lower connection part LC of the joint boundary part BR, in which the bent part BE is positioned on a side of the lower flange part 111*f* close to the first hook reinforcement part 111. In this way, the bent part BE positioned on the front side of the lower connection part LC of the joint boundary part BR can make the hook reinforcement part 110 deform at the target position even when the vehicle 10 receives a collision load from the rear.

In this way, the hook reinforcement part 110 of the vehicle body rear structure 100 can make the hook reinforcement part 110 bend at a target position by the disposition of the weakened part WK and the bent part BE of the joint boundary part BR, so that the deformation mode of the vehicle body rear structure 100 when receiving a collision load from the rear of the vehicle 10 may be easily controlled. Further description will be made in conjunction with FIG. 5A and FIG. 5B below.

Figure 5A:
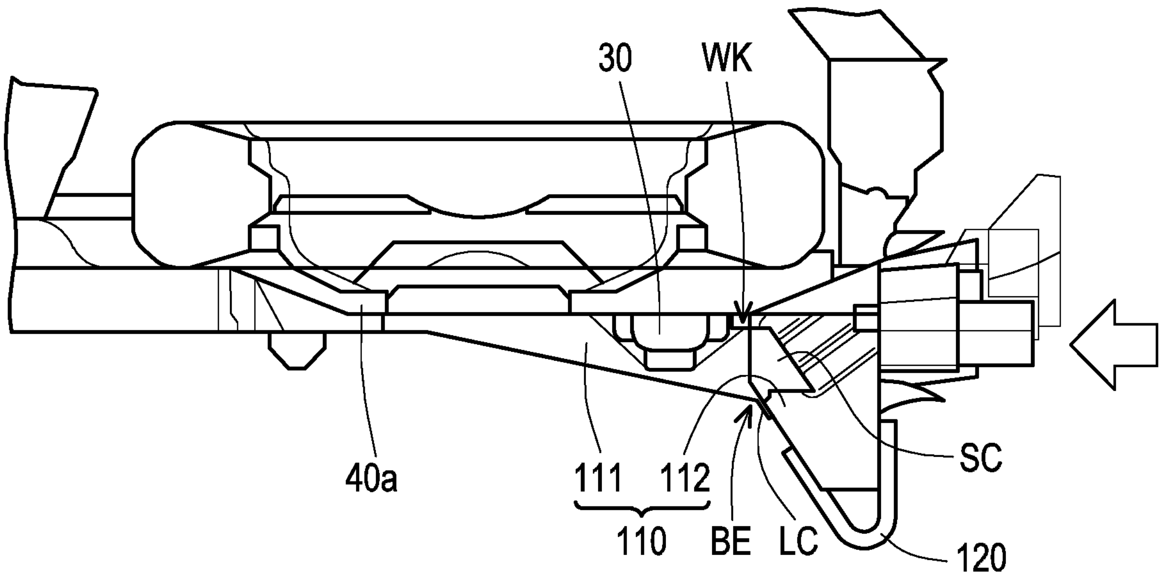
FIG. 5A and FIG. 5B are schematic status views of the vehicle body rear structure before the rear collision and after the collision, respectively.
Figure 5B:
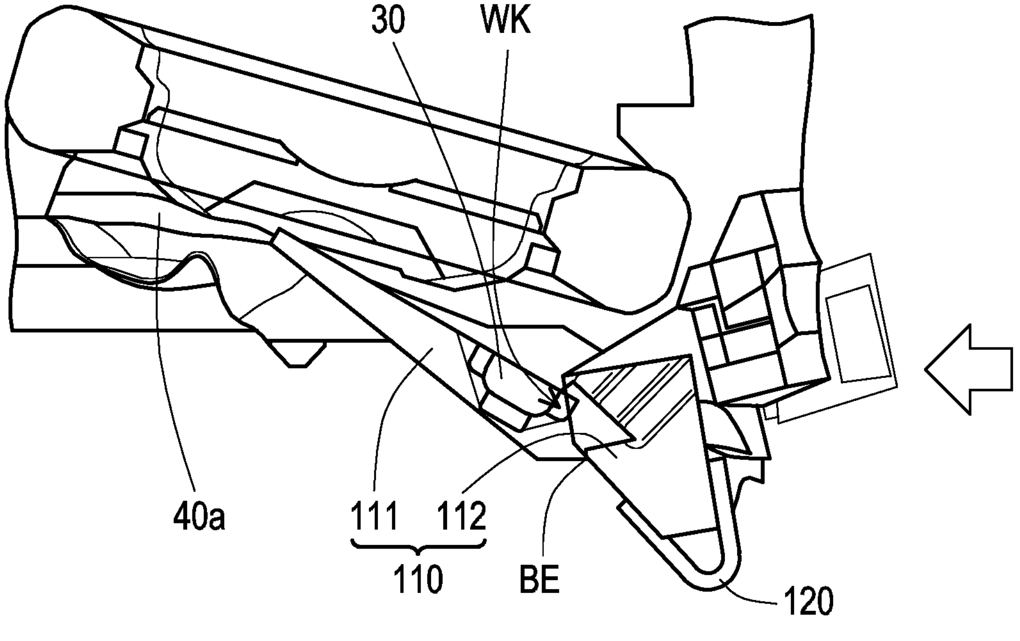

FIG. 5A and FIG. 5B are schematic status views of the vehicle body rear structure before the rear collision and after the collision, respectively. As shown in FIG. 5A and FIG. 5B, in this embodiment, when the vehicle body rear structure 100 is subjected to rear collision, the hook reinforcement part 110 bends at the weakened part WK of the joint boundary part BR. At this time, as shown in FIG. 5B, the chassis rear 40*a* and the spare tire thereon is lifted forward and upward due to the deformation of the hook reinforcement part 110, so that the hook reinforcement part 110 cannot invade the housing at the front accommodating electrical components of the vehicle body when deformation occurs, and the damage to the vehicle 10 during the collision from the rear can be reduced.

In addition, as shown in FIG. 3 and FIG. 4, in this embodiment, the back end part 111*b* of the first hook reinforcement part 111 and the upper end part 112*a* of the second hook reinforcement part 112 are formed as a side connection part SC of the joint boundary part BR in such a manner that a side part 111*s* of the first hook reinforcement part 111 and a side part 112*s* of the second hook reinforcement part 112 are connected to each other in the width direction of the vehicle. Specifically, in the embodiment, the side connection part SC is formed in such a manner that one of the first hook reinforcement part 111 and the second hook reinforcement part 112 is covered by the other one of the first hook reinforcement part 111 and the second hook reinforcement part 112 from outside of the width direction of the vehicle, and a welding bead outline BD extending in such a manner including a position corresponding to a spot welding part is formed on the side part of one of the first hook reinforcement part and the second hook reinforcement part. For example, as shown in FIG. 4, in this embodiment, the side part 112*s* of the second hook reinforcement part 112 is covered by the side part 111*s* of the first hook reinforcement part 111 outwardly in the width direction of the vehicle, and the side part 112*s* of the second hook reinforcement part 112 is formed with the welding bead outline BD. In this way, in addition to increasing the rigidity of the hook reinforcement part 110, positioning can be performed easily during spot welding, and workability can be improved. Moreover, in this embodiment, the hook 120 of the vehicle body rear structure 100 can also increase the upper limit of the towing force when being towed by the towing device through the disposition of the side connection part SC and the lower connection part LC of the joint boundary part BR. Further description will be made in conjunction with FIG. 6A and FIG. 6B below.

Figure 6A:
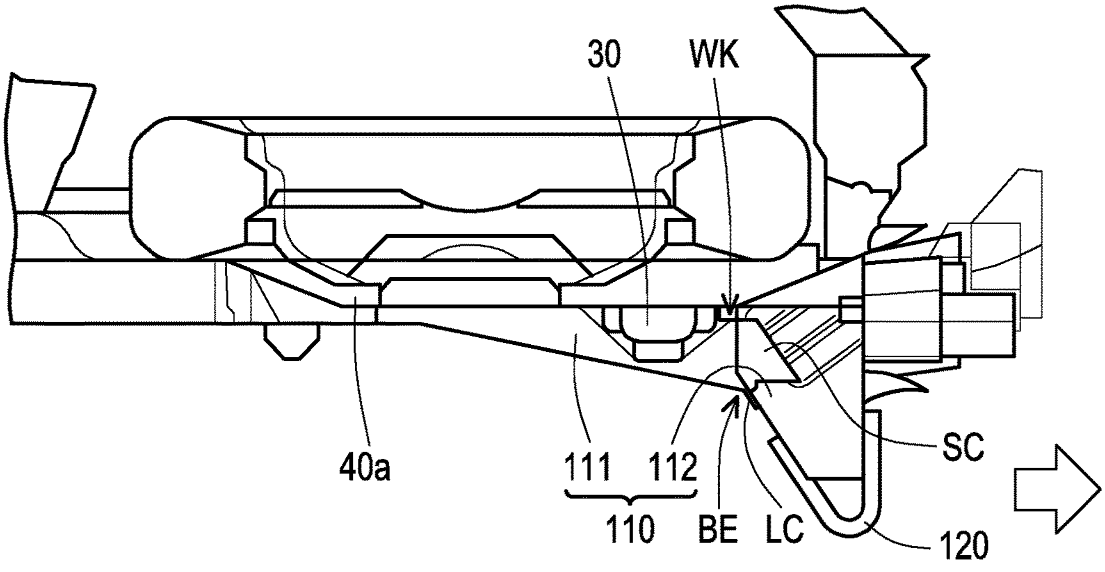
FIG. 6A and FIG. 6B are schematic status views of the vehicle body rear structure before towing and after towing, respectively.
Figure 6B:
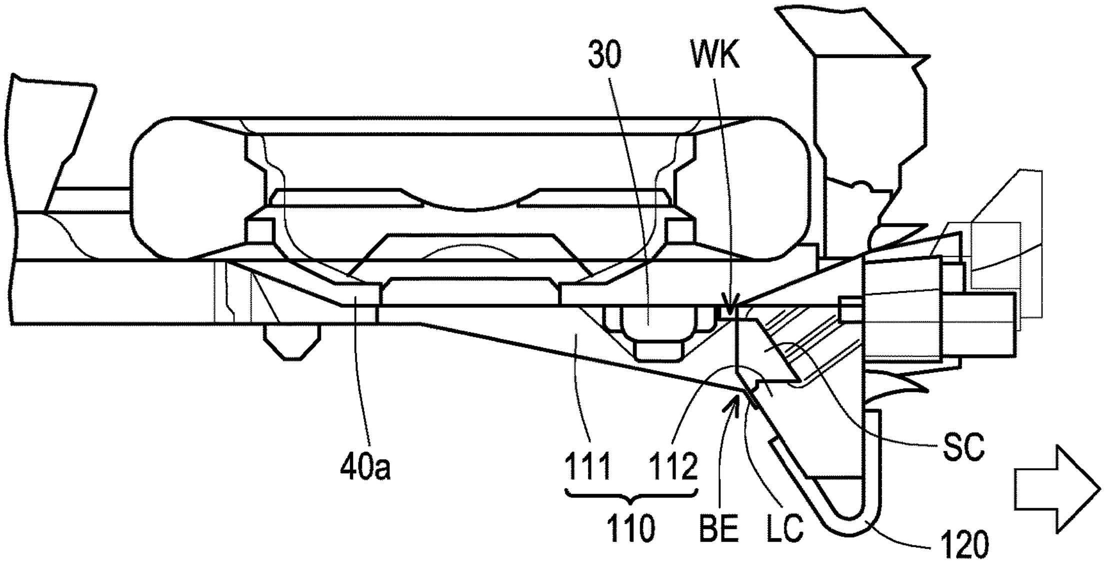

FIG. 6A and FIG. 6B are schematic status views of the vehicle body rear structure 100 before towing and after towing, respectively. As shown in FIG. 6A and FIG. 6B, in this embodiment, when being towed by the towing device, since the load of the towing force is in the shear direction rather than the peeling direction with respect to the side connection part SC, the side connection part SC only receives the plane stress from the load of the towing force and is not damaged locally. Similarly, when the hook 120 of the vehicle body rear structure 100 is performing towing obliquely through the disposition of the lower connection part LC of the joint boundary part BR, since the load of the towing force of the oblique pull is also in a shear direction instead of a peel direction with respect to the lower connection part LC, the load of the towing force on the lower connection part LC is also a plane stress without local damage. Moreover, since the side connection part SC and the lower connection part LC of the joint boundary part BR may be superimposed by the thicknesses of connection parts of the first hook reinforcement part 111 and the second hook reinforcement part 112, both have high rigidity. In this way, during towing by the towing device, the reliability of the vehicle body rear structure 100 can be ensured even when the towing force is increased.

In summary, in the embodiment of the disclosure, the hook reinforcement part of the vehicle body rear structure can be bent at the target position through the disposition of the weakened part and the bent part of the joint boundary part, and the hook reinforcement part can be easily bent, and the deformation mode of the vehicle body rear structure when receiving a collision load from the rear of the vehicle may be easily controlled, so that the hook reinforcement part cannot invade the housing at the front accommodating the electrical components of the vehicle body when deformation occurs, and the damage to the vehicle during the collision from the rear can be reduced. Moreover, the hook of the vehicle body rear structure can also increase the upper limit of the towing force when being towed by the towing device through the disposition of the side connection part and the lower connection part of the joint boundary part. Furthermore, since the welding bead outline is formed near the side connection part of the hook reinforcement part to the joint boundary part, positioning can be performed easily during spot welding, and workability can be improved.

Finally, it should be noted that the above embodiments are only used to illustrate the technical solutions of the disclosure, rather than to limit them; although the disclosure has been described in detail with reference to the embodiments, persons skilled in the art should understand that it is still possible to modify the technical solutions described in the embodiments, or perform equivalent replacements for some or all of the technical features. However, the modifications or substitutions do not make the essence of the corresponding technical solutions depart from the scope of the technical solutions of the embodiments of the disclosure.

What is claimed is:

1. A vehicle body rear structure, comprising:

a chassis rear;

a hook reinforcement part fixed to a lower surface of the chassis rear; and a hook fixed on a back side of the chassis rear through the hook reinforcement part, wherein the hook reinforcement part comprises a plurality of part members independent from each other, the plurality of part members are connected in series and joined in a front-back direction of the vehicle to form a joint boundary part, and the joint boundary part is disposed with a weakened part on a side close to the chassis rear, the plurality of part members of the hook reinforcement part comprises a first hook reinforcement part and a second hook reinforcement part, the first hook reinforcement part and the second hook reinforcement part are formed as a side connection part of the joint boundary part in such a manner that a side part of the first hook reinforcement part and a side part of the second hook reinforcement part are connected to each other in a width direction of the vehicle, the side connection part is formed in such a manner that one of the first hook reinforcement part and the second hook reinforcement part is covered by the other one of the first hook reinforcement part and the second hook reinforcement part from outside of the width direction of the vehicle, and the weakened part is a notch part formed on the side connection part.

2. The vehicle body rear structure according to claim 1, wherein:

the joint boundary part is disposed with a bent part on a side away from the chassis rear.

3. The vehicle body rear structure according to claim 2, wherein a size of the first hook reinforcement part in the front-back direction of the vehicle is larger than a size in an up-down direction of the vehicle, and a size of the second hook reinforcement part in the front-back direction of the vehicle is smaller than a size in the up-down direction of the vehicle.

4. The vehicle body rear structure according to claim 3, wherein:

a welding bead outline extending in such a manner comprising a position corresponding to a spot welding part is formed on the side part of the one of the first hook reinforcement part and the second hook reinforcement part.

5. The vehicle body rear structure according to claim 3, wherein the first hook reinforcement part has a lower flange part, and the lower flange part extends in a direction away from the chassis rear and is connected with a front surface of the second hook reinforcement part to form a lower connection part of the joint boundary part.

6. The vehicle body rear structure according to claim 5, wherein the bent part is positioned on a side of the lower flange part close to the first hook reinforcement part.

7. A vehicle, comprising:

the vehicle body rear structure according to claim 1.

8. A vehicle, comprising:

the vehicle body rear structure according to claim 2.

9. A vehicle, comprising:

the vehicle body rear structure according to claim 3.

10. A vehicle, comprising:

the vehicle body rear structure according to claim 4.

11. A vehicle, comprising:

the vehicle body rear structure according to claim 5.

12. A vehicle, comprising:

the vehicle body rear structure according to claim 6.

* * * * *